US010515194B2

(12) United States Patent
Koo

(10) Patent No.: US 10,515,194 B2
(45) Date of Patent: Dec. 24, 2019

(54) KEY ROTATION SCHEME FOR DRM SYSTEM IN DASH-BASED MEDIA SERVICE

(71) Applicant: ELECTRONICS AND TELECOMMUNICATIONS RESEARCH INSTITUTE, Daejeon (KR)

(72) Inventor: Han-Seung Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 177 days.

(21) Appl. No.: 15/682,743

(22) Filed: Aug. 22, 2017

(65) Prior Publication Data

US 2018/0060544 A1    Mar. 1, 2018

(30) Foreign Application Priority Data

Aug. 29, 2016  (KR) .......................... 10-2016-0109729
Nov. 28, 2016  (KR) .......................... 10-2016-0159213
Jul. 11, 2017  (KR) .......................... 10-2017-0087966

(51) Int. Cl.
*G06F 21/10* (2013.01)
*G06F 21/60* (2013.01)
*H04L 9/08* (2006.01)

(52) U.S. Cl.
CPC .......... *G06F 21/105* (2013.01); *G06F 21/602* (2013.01); *G06F 21/604* (2013.01);
(Continued)

(58) Field of Classification Search
CPC ..................................................... G06F 21/105
See application file for complete search history.

(56) References Cited

U.S. PATENT DOCUMENTS 8,130,963 B2 * 3/2012 Deaver .................. H04N 5/913
380/225
8,751,807 B2 * 6/2014 Ma ........................ H04L 9/0891
713/168
(Continued)

OTHER PUBLICATIONS

"Guidelines for Implementation: DASH-AVC/264 Interoperability Points," DASH Industry Forum, Version 1.03, Jun. 4, 2013; pp. 1-35.
(Continued)

*Primary Examiner* — Ali Shayanfar
(74) *Attorney, Agent, or Firm* — Kile Park Reed & Houtteman PLLC

(57) ABSTRACT

Disclosed herein is a key rotation scheme for a DRM system in a DASH-based media content service. A DASH encoder generates media decryption keys and provides a key list including the media decryption keys to a CP manager. Each media decryption key is identified by a key identifier (KID). The CP manager delivers the key list to a license server. The license server creates ECLs based on the key list, and delivers an ECL list including ECLs to the CP manager. Each ECL is identified by KID and includes an encrypted media decryption key and an encrypted KID. The CP manager generates a pssh box in which the ECL list is inserted into a data field, and delivers the pssh box to the DASH encoder. The DASH encoder delivers the pssh box to a client device, with the pssh box being included in a DASH MPD or media segment.

5 Claims, 3 Drawing Sheets

(52) U.S. Cl.
CPC ............ *H04L 9/083* (2013.01); *H04L 9/0822* (2013.01); *H04L 9/0861* (2013.01); *H04L 9/0891* (2013.01); *G06F 2221/0753* (2013.01); *G06F 2221/0755* (2013.01); *H04L 2209/603* (2013.01)

(56) References Cited

U.S. PATENT DOCUMENTS

| | | | | |
|---|---|---|---|---|
| 9,015,477 | B2 * | 4/2015 | Giladi | H04L 9/32 |
| | | | | 713/160 |
| 9,628,487 | B2 * | 4/2017 | Wang | H04L 63/10 |
| 9,794,240 | B2 * | 10/2017 | Liu | G06F 16/9566 |
| 10,140,408 | B2 * | 11/2018 | Mandyam | H04L 63/0428 |
| 2012/0114118 | A1 * | 5/2012 | Verma | H04L 9/088 |
| | | | | 380/42 |
| 2013/0318347 | A1 * | 11/2013 | Moffat | H04L 63/06 |
| | | | | 713/168 |
| 2015/0188927 | A1 * | 7/2015 | Santhi | H04L 63/104 |
| | | | | 726/4 |
| 2016/0234682 | A1 * | 8/2016 | Mandyam | G06F 21/10 |
| 2016/0302214 | A1 | 10/2016 | Yun et al. | |
| 2016/0337679 | A1 | 11/2016 | Lee et al. | |
| 2017/0171610 | A1 * | 6/2017 | Nair | H04N 21/2362 |
| 2017/0339105 | A1 * | 11/2017 | Gavade | H04L 67/18 |
| 2018/0083920 | A1 * | 3/2018 | Valsecchi | G06F 21/105 |
| 2018/0091857 | A1 * | 3/2018 | Valsecchi | G06F 21/105 |

OTHER PUBLICATIONS

"Guidelines for Implementation: DASH-IF Interoperability Points," DASH Industry Forum, Version 4.0, Dec. 12, 2016; pp. 1-143.
"Guidelines for Implementation: DASH-IF Interoperability Points," DASH Industry Forum, Version 3.3, Jun. 12, 2016; pp. 1-128.

* cited by examiner

KEY ROTATION SCHEME FOR DRM SYSTEM IN DASH-BASED MEDIA SERVICE

CROSS REFERENCE TO RELATED APPLICATIONS

This application claims the benefit of Korean Patent Application Nos. 10-2016-0109729, filed Aug. 29, 2016, 10-2016-0159213, filed Nov. 28, 2016, and 10-2017-0087966, filed Jul. 11, 2017, which are hereby incorporated by reference in their entirety into this application.

BACKGROUND OF THE INVENTION

1. Technical Field

The present invention relates to a key rotation scheme for a Digital Rights Management (DRM) system in a Dynamic Adaptive Streaming over Hypertext transfer protocol (DASH)-based media service.

2. Description of the Related Art

Descriptions contained in this field are merely intended to provide background information related to the present embodiment, rather than describing the configuration of conventional technology.

Entitlement Control License (ECL) is one of methods for content protection when a Dynamic Adaptive Streaming over HTTP (DASH)-based media service is provided. DASH enables media content to be protected based on MPEG Common Encryption (MPEG-CENC) standards. Here, media content is created with encryption based on an encryption key at the most basic level. There are a plurality of elements for classifying the strength of content protection, one of which is to periodically change an encryption key. Periodically changing an encryption key is referred to as "key rotation". ECL is a license used for a key hierarchy method, which is one of known methods of changing an encryption key for key rotation.

Standards known to date merely describe that "if it is desired to use a key hierarchy method when DASH-based media is encrypted using a key rotation scheme, ECL and Entitlement Management License (EML) may be used, ECL must include an encrypted media decryption key, and EML must include a decryption key required to decrypt the encrypted media decryption key" but do not specify the detailed operation of ECL or EML. In the case of EML, it does not matter if a content security service provider freely operates the EML using his or her own method. However, in the case of ECL, ECL is data that is included in media content and is transmitted through media and a transmission channel, and thus much clearer standardized rules are required.

SUMMARY OF THE INVENTION

Accordingly, the present invention has been made keeping in mind the above problems occurring in the prior art, and an object of the present invention is to provide an ECL operation method that satisfies the above-described requirement.

In accordance with an aspect of the present invention, there is provided a method for managing secure distribution of media content in a system for a Dynamic Adaptive Streaming over Hypertext transfer protocol (DASH)-based media service. The method may include generating, by a DASH encoder, multiple media decryption keys and providing, by the DASH encoder, a key list including the generated media decryption keys to a Content Protection (CP) manager. Each of the media decryption keys in the key list may be identified by a key identifier (KID). The method may further include delivering, by the CP manager, the key list received from the DASH encoder to a license server; and creating, by the license server, multiple Entitlement Control Licenses (ECLs) based on the key list, and delivering, by the license server, an ECL list including the created ECLs to the CP manager. Each of the ECLs in the ECL list may be identified by a key identifier (KID) and may include an encrypted media decryption key and an encrypted KID. The method may further include generating, by the CP manager, a Protection System Specific Header (pssh) box in which the ECL list is inserted into a data field, and delivering, by the CP manager, the generated pssh box, to the DASH encoder; and delivering, by the DASH encoder, the pssh box to a client device, with the pssh box being included in a DASH Media Presentation Description (MPD) or a media segment.

Embodiments of the method may further include one or more of the following features.

In some embodiments, the method may further include delivering, by a DASH decoder, the pssh box to a DRM client by parsing a DASH stream, wherein the DASH decoder and the DRM client are included in the client device; and decrypting, by the DRM client, the key list, from multiple ECLs included in the pssh box, using a decryption key included in a previously acquired Entitlement Management License (EML). Here, the DASH decoder and the DRM client may be included in the client device.

In some embodiments, the method may further include storing, by the DRM client, a decrypted key list, in storage provided in the client device; transmitting, by the DASH decoder, a KID of a media decryption key to be used in a current key change interval to the DRM client; retrieving, by the DRM client, a media decryption key corresponding to the KID, received from the DASH decoder, from the storage, and delivering, by the DRM client, the retrieved media decryption key, to the DASH decoder; and decrypting, by the DASH decoder, media segments received in the current key change interval, using the media decryption key received from the DRM client.

In accordance with another aspect of the present invention, there is provided a computerized device functioning as a CP manager for managing secure distribution of media content in a system for a DASH-based media service, including memory for storing computer program instructions; one or more processors; an input/output interface circuit; and one or more data buses for mutually connecting the memory, the processors, and the input/output interface circuit. Each of the processors may execute the computer program instructions and then allow the computerized device to perform a method including delivering a key list including media decryption keys from a DASH encoder to a license server, wherein each of the media decryption keys in the key list is identified by a key identifier (KID); receiving an ECL list created based on the key list from the license server, wherein each of ECLs in the ECL list is identified by a key identifier (KID) and includes an encrypted media decryption key and an encrypted KID; and generating a pssh box in which the ECL list is inserted into a data field, and delivering the generated pssh box to the DASH encoder, wherein the pssh box is delivered by the DASH encoder to a client device, with the pssh box being included in a DASH MPD or a media segment.

In accordance with a further aspect of the present invention, there is provided a system for a DASH-based media service, including one or more server computers connected to a client device over a content delivery network, the server computers each including a DASH encoder, a CP manager, and a license server. The DASH encoder may be configured to generate a key list including multiple media decryption keys identified by key identifiers (KIDs), and deliver a pssh box received from the license server to the client device, with the pssh box being included in a DASH MPD or a media segment. The license server may be configured to create multiple ECLs based on the key list and deliver an ECL list including the created ECLs to the CP manager. Each of the ECLs may include an encrypted media decryption key and an encrypted KID that correspond to each other. The CP manager may be configured to receive the key list from the DASH encoder, deliver the key list to the license server, generate a pssh box in which the ECL list received from the license server is inserted, and deliver the generated pssh box to the DASH encoder. The ECL list may be included in a data field of the pssh box.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
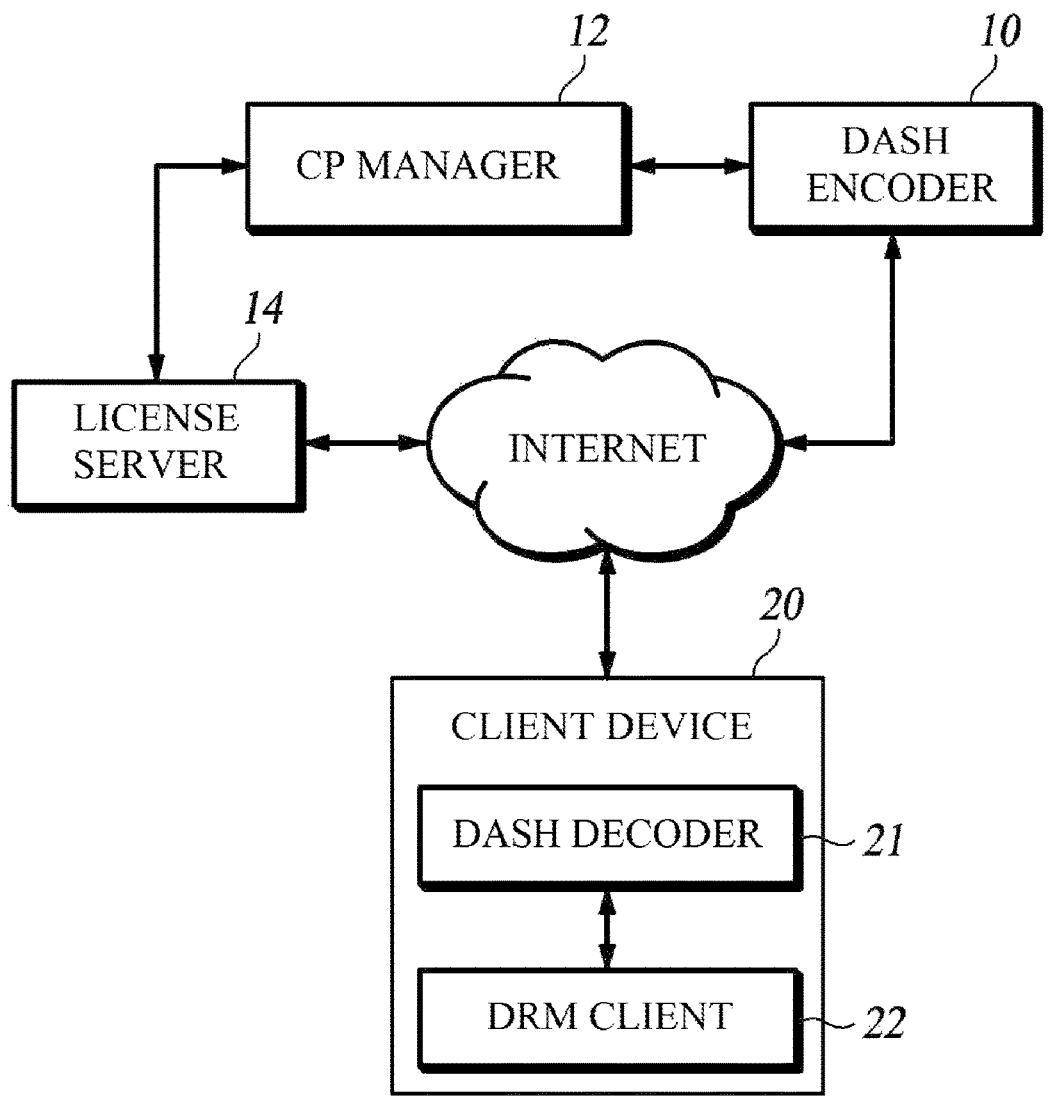
FIG. 1 is a diagram illustrating components constituting a DRM system and the communication flow of the DRM system.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

In the present specification, it should be understood that terms such as "include" or "have" are merely intended to indicate that components are present, and are not intended to exclude the possibility that one or more other components thereof will be present or added, unless a description to the contrary is specifically pointed out in context. Further, "server," described in the present specification, denotes a general-purpose or special-purpose computer system, and such a computer system typically has memory, an input/output circuit, and instruction-processing logic having mutual connections, such as one or more data buses that connect the above components to each other. Therefore, technologies disclosed in the present specification may be implemented as software executed by one or more computer systems. Similarly, "client device" denotes a computerized device including the above-described components and software to be executed, and refers to a computerized device that is capable of receiving content from a network, decoding the received content, and rendering the content on a display or similar output devices.

FIG. 1 is a diagram illustrating a content delivery system according to an embodiment of the present invention.

A content delivery system 100 includes a DASH encoder 10, a Content Protection (CP) manager 12, a license server 14, and a client device 20. The DASH encoder 10, the CP manager 12, and the license server 14 are logical objects obtained by functionally classifying a DRM system, which includes some of the components of a service platform for providing a media content service (e.g. Over-the-Top (OTT) service). Therefore, one or more physical objects (i.e. server computer systems) may also perform functions that are performed by a plurality of logical objects. For example, in some embodiments, the CP manager 12 and the license server 14 may be included in the same physical server.

The DASH encoder 10 creates a media stream to be delivered to the client device 20. The DASH encoder 10 encrypts content using a standardized encryption technique in conformity with a content format, such as an ISO base media file format [ISO/IEC 14496-12]. The DASH encoder 10 implements a key rotation function with time duration. That is, the DASH encoder 10 encrypts media segments using different encryption keys in respective key change intervals.

The CP manager 12 manages the distribution of content decryption keys that are used to protect media streams in collaboration with the DASH encoder 10 and the license server 14.

The license server 14 creates licenses to be delivered to an authorized client device 20 in collaboration with the CP manager 12. The licenses include an Entitlement Management License (EML) and an Entitlement Control License (ECL). The ECL includes information about media decryption keys that are used by the client device 20 to decrypt encrypted content, and the EML includes key information that is used to extract media decryption keys from the ECL. The delivery of licenses will be described in detail later with reference to FIGS. 2 and 3.

The content delivery system 100 may further include an authentication server (not shown) to implement an authentication/authorization function. The authentication server authenticates a user and verifies subscriber information in collaboration with the CP manager 12. When a service is accessed by the user, the authentication server may perform authentication and authorization by verifying a user ID and a password stored in the subscriber management system (not shown) of a service operator. The authentication server delivers the results of authentication and authorization to the CP manager 12, and thus the creation of a DASH stream including license processing is initiated.

The client device 20 receives a license and a DASH stream in response to a user's playback request, and decrypts and displays the DASH stream using media decryption keys included in the license. The client device 20 includes a DASH decoder 21 and a DRM client 22. In some embodiments, the DRM client 22 may have a playback function (i.e. a decoder function) embedded in the client device 20 to decrypt and display content. The client device 20 includes a set-top box or a non-set-top box (e.g. a smart phone, a tablet PC, a notebook, etc.).

The content delivery system 100 supports a "key rotation" function for updating keys with the passage of time. Media decryption keys are changed at intervals of a preset time to intensify security for content protection. The changing of keys is mainly used to change qualification during the streaming of content. The present invention uses a so-called "key hierarchy" method that uses ECL and EML when DASH-based media is encrypted using a key-rotation scheme.

Figure 2:
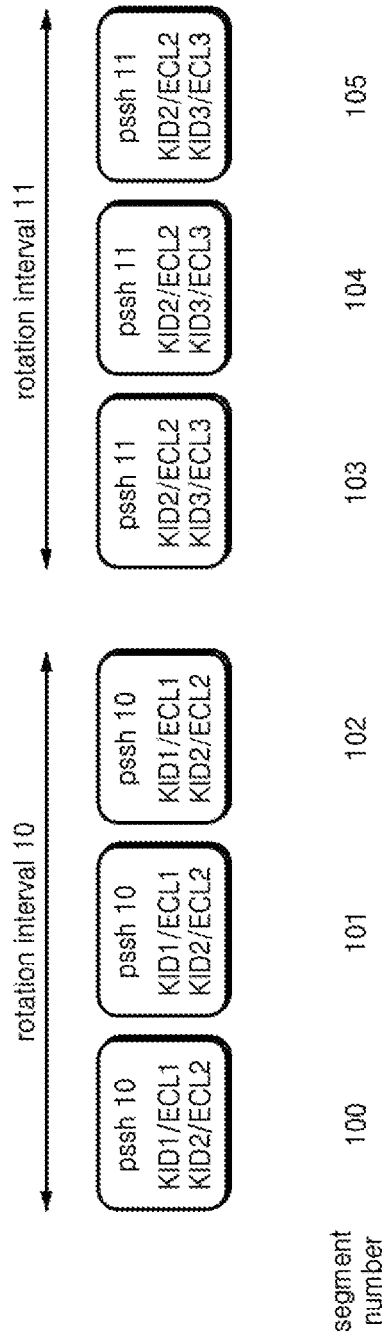
FIG. 2 is a diagram illustrating a scheme for providing information about ECL-based current and future keys to a pssh box according to an embodiment of the present invention.

FIG. 2 is a diagram illustrating a scheme for providing information about ECL-based current and future keys to a Protection System Specific Header (pssh) box according to an embodiment of the present invention.

An MPEG Common Encryption (CENC) standard (ISO/IEC 23001-7) is a common encryption standard including an encryption method, an encryption key mapping method, and an encryption metadata display method, which are related to an ISO base media file format (ISOBMFF). This standard enables different content protection systems to perform encryption/decryption in an ISOBMFF using a common method other than their own encryption methods. Each content protection system may focus on key management (e.g. a decryption key acquisition method, a storage method, etc.) and access rights management (e.g. rights, licenses, etc.) rather than on an encryption method.

Under MPEG/3GP DASH protocols, media segments or initialization segments may be used to deliver new media keys that are changed within a single track. The initialization segments may contain one or more pssh boxes in a Movie box (moov box) defined by the MPEG CENC standard. The media segments may contain pssh boxes in Movie Fragment boxes (moof boxes). Also, the pssh boxes may be contained in a Media Presentation Description (MPD).

The pssh boxes deliver information about new keys or licenses, and the client device acquires information from the pssh boxes contained in the initialization segments or the media segments to acquire media decryption keys.

As shown in FIG. 2, each pssh box includes at least two pairs of Key Identifier (KID)/ECL related to current and future content keys, and includes the same KID/ECL pair values at intervals of a key change period. The reason for needing at least two pairs is to prevent a phenomenon in which a service is interrupted or delayed by securing required KID/ECL before subsequent key rotation occurs. Generally, the pssh box must include many more than two pairs in order to prevent the occurrence of a so-called "client storm" phenomenon, in which client devices simultaneously request new keys from a license server on key change boundaries.

Figure 3:
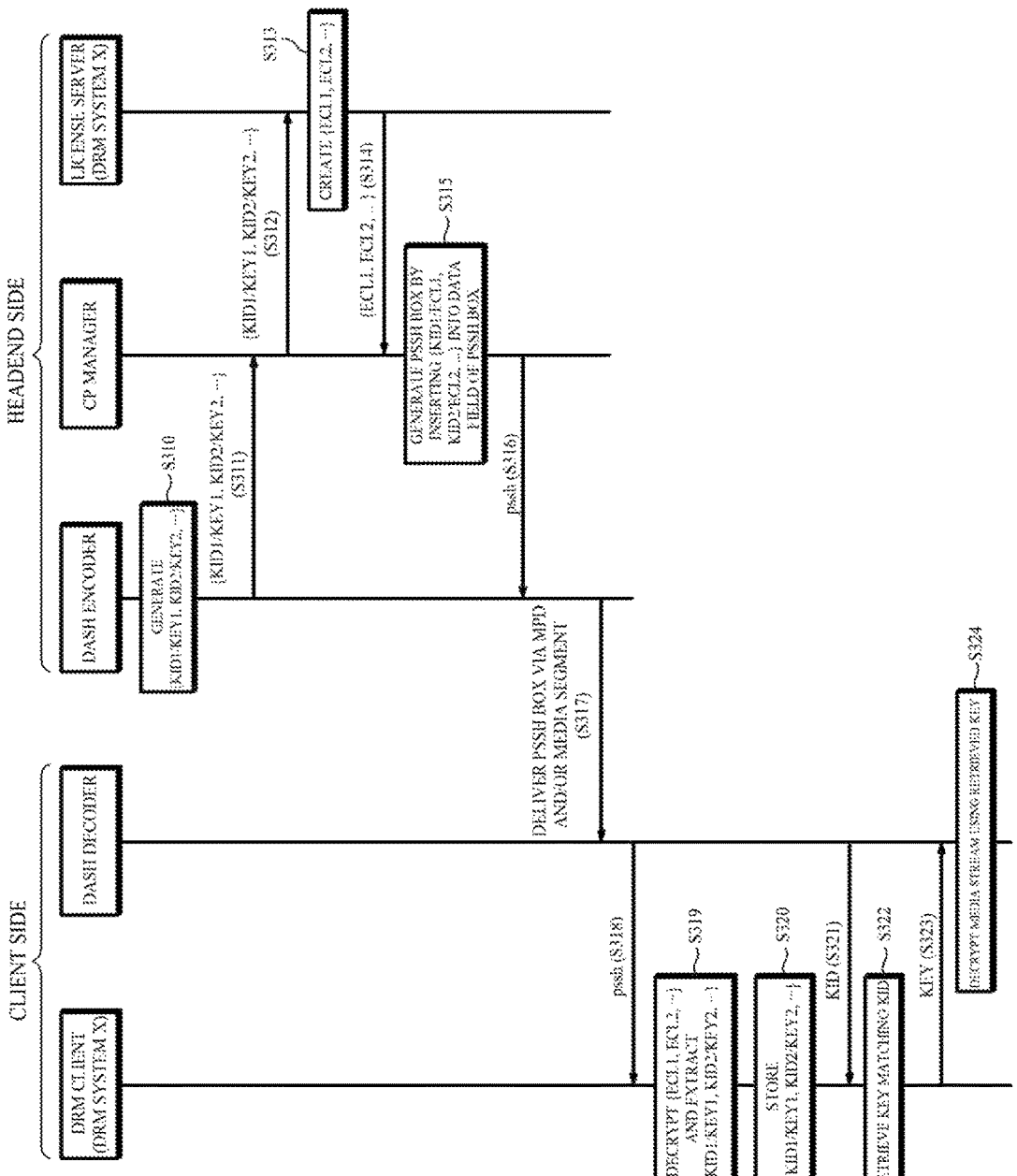
FIG. 3 is a flowchart illustrating a method for performing content delivery and decryption using key change according to an embodiment of the present invention.

FIG. 3 is a flowchart illustrating a method for performing content delivery and decryption using key change according to an embodiment of the present invention.

A "DRM system X" shown in FIG. 3 is an exemplary element indicating one of proprietary DRM systems, and both a license server and a DRM client are dedicated to the DRM system X.

A DASH encoder generates a list of Key Identifier (KID)/media decryption key (KEY) pairs, in which KIDs and KEYs are paired at step S310. Here, KID denotes a key identifier assigned to each KEY. The number of KID/KEY pairs must be two or more. The configuration of KID/KEY pairs may be implemented differently depending on respective DRM solutions. The generated pairs are delivered to a CP manager at step S311. The media decryption keys are used by a DASH decoder to decrypt media segments.

The CP manager delivers the KID/KEY pair list, received from the DASH encoder, to the license server at step S312.

The license server creates ECLs based on the KID/KEY pair list at step S313. Each ECL contains an encrypted KID/KEY pair. Therefore, the license server delivers an ECL list including the created ECLs to the CP manager at step S314. In the ECL list, respective ECLs are identified by KIDs. Here, methods for KID/KEY encryption and the configuration of ECLs may differ for respective DRM systems.

The CP manager generates a pssh box based on KID/ECL pairs at step S315. Here, the KID/ECL pairs must be included in the data field of the pssh box, rather than the pssh box itself. The generated pssh box is delivered to the DASH encoder at step S316.

The DASH encoder streams the content that is encrypted using a key, which is used in a current key change interval, from the generated KID/KEY pair list to the DASH decoder based on an MPEG DASH standard. Here, the DASH encoder delivers the pssh box, received from the CP manager, to the DASH decoder, with the pssh box being included in an MPD or a media segment, at step S317.

The DASH decoder parses the received DASH stream and extracts the pssh box from the DASH stream. Thereafter, the DASH decoder delivers the pssh box to the DRM client at step S318.

The DRM client decrypts KID/KEY pairs from the delivered ECLs, and thereafter stores the decrypted KID/KEY pairs in secure storage (i.e. a database) at steps S319 and S320. The decryption key used to decrypt the KID/KEY pairs is obtained from an EML. As methods for configuring and processing the EML, suitable methods may be employed for respective DRM solutions, which may not fall within the scope of the gist of the present invention.

When receiving a KID value from the DASH decoder, the DRM client retrieves a key corresponding to the KID value from the KID/KEY pairs, stored in the storage, and delivers the retrieved key to the DASH decoder at steps S321 to S323.

The DASH decoder decrypts the DASH media stream using the received KEY at step S324.

As described above, the media keys, which are continuously changed, are delivered together with an MPD or a media segment, whereby it is possible to acquire licenses in real time, and there is no need to repeatedly perform client authentication, authorization, etc. Therefore, seamless content playback without interruption becomes possible.

Although the embodiment shown in FIG. 3 describes that the KID/KEY pair list generated by the DASH encoder is delivered to the CP manager and to the license server, it is possible to realize configuration such that the CP manager or the license server generates a KID/KEY pair list in other embodiments. For example, the CP manager may generate a KID/KEY pair list and may deliver it to the DASH encoder and to the license server.

Although, in the above embodiments, MPEG/3GP Dynamic Adaptive Streaming over HTTP (DASH) has been exemplarily described as being a segment-based content distribution protocol, it is apparent that the key exchange scheme proposed in the present invention may also be applied to other segment-based protocols (e.g. HTTP live streaming, Silverlight smooth streaming, etc.).

As described above, in accordance with the present invention, there are provided ECL operational rules when a key rotation function is provided using an ECL-based key hierarchy method in a DASH-based media service.

Further, in accordance with the present invention, media keys that are continuously changed are delivered to an in-band range, so that it is possible to acquire licenses in real time, and there is no need to repeatedly perform client authentication, authorization, etc. Therefore, seamless content playback without interruption becomes possible.

Hereinbefore, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that varioush modifications and other equivalent embodiments are possible from the embodiments. Therefore, the technical scope of the present invention should be defined based on the technical spirit of the claims.

What is claimed is:

1. A method for managing secure distribution of media content in a system for a Dynamic Adaptive Streaming over Hypertext transfer protocol (DASH)-based media service, comprising:
generating, by a DASH encoder, pairs of key identifiers (KID) and media decryption keys and providing, by the DASH encoder, a key list including the generated pairs to a Content Protection (CP) manager, wherein each of the media decryption keys corresponds to each of the key identifiers (KID);
delivering, by the CP manager, the key list received from the DASH encoder to a license server;
creating, by the license server, multiple Entitlement Control Licenses (ECLs) based on the key list, and delivering, by the license server, an ECL list including the created ECLs to the CP manager, wherein each of the ECLs in the ECL list includes an encrypted media decryption key and an encrypted KID;
generating, by the CP manager, a Protection System Specific Header (pssh) box in which the ECL list is inserted into a data field, and delivering, by the CP manager, the generated pssh box to the DASH encoder;
delivering, by the DASH encoder, the pssh box to a client device, with the pssh box being included in a DASH Media Presentation Description (MPD) or a media segment;
delivering, by a DASH decoder, the pssh box to a DRM client by parsing a DASH stream, wherein the DASH decoder and the DRM client are included in the client device; and
decrypting, by the DRM client, the encrypted media decryption key and the encrypted KID from the ECL list included in the pssh box.

2. The method of claim 1, further comprising:
storing, by the DRM client, a decrypted key list, in storage provided in the client device;
transmitting, by the DASH decoder, a key identifier (KID) of a media decryption key to the DRM client;
retrieving, by the DRM client, a media decryption key corresponding to the KID, received from the DASH decoder, from the storage, and delivering, by the DRM client, the retrieved media decryption key, to the DASH decoder; and
decrypting, by the DASH decoder, media segments, using the media decryption key received from the DRM client.

3. A method for managing secure distribution of media content in a system for a Dynamic Adaptive Streaming over Hypertext transfer protocol (DASH)-based media service, comprising:
generating, by a DASH encoder, pairs of key identifiers (KID) and media decryption keys and providing, by the DASH encoder, a key list including the generated pairs to a Content Protection (CP) manager, wherein each of the media decryption keys corresponds to each of the key identifier (KID);

delivering, by the CP manager, the key list received from the DASH encoder to a license server;
creating, by the license server, multiple Entitlement Control Licenses (ECLs) based on the key list, and delivering, by the license server, an ECL list including the created ECLs to the CP manager, wherein each of the ECLs includes an encrypted media decryption key and an encrypted KID;
generating, by the CP manager, a pssh box in which the ECL list is inserted into a data field, and delivering, by the CP manager, the generated pssh box to the DASH encoder;
delivering, by the DASH encoder, the pssh box to a client device, with the pssh box being included in a DASH MPD or a media segment; and
decrypting, by the client device, the encrypted media decryption key and the encrypted KID, from the ECL list included in the pssh box.

4. A computerized device functioning as a Content Protection (CP) manager for managing secure distribution of media content in a system for a Dynamic Adaptive Streaming over Hypertext transfer protocol (DASH)-based media service, comprising:
memory for storing computer program instructions;
one or more processors;
an input/output interface circuit; and
one or more data buses for mutually connecting the memory, the processors, and the input/output interface circuit,
wherein each of the processors executes the computer program instructions and then allows the computerized device to perform a method comprising:
delivering a key list including pairs of key identifiers (KID) and media decryption keys from a DASH encoder to a license server, wherein each of the media decryption keys corresponds to each of the key identifier (KID);
receiving an ECL list from the license server, wherein the ECL list including the created ECLs to the CP manager wherein each of the ECLs includes an encrypted media decryption key and an encrypted KID;
generating a pssh box in which the ECL list is inserted into a data field, and delivering the generated pssh box to the DASH encoder, wherein the pssh box is delivered by the DASH encoder to a client device, with the pssh box being included in a DASH MPD or a media segment; and
decrypting, by the client device, the encrypted media decryption key and the encrypted KID, from the ECL list included in the pssh box.

5. A system for a (Dynmaic Adaptive Streaming over Hypertext transfer Protocol) DASH-based media service, comprising:
one or more server computers connected to a client device over a content delivery network, the server computers each including a DASH encoder, a Content Protection (CP) manager, and a license server,
wherein the DASH encoder generates a key list including pairs of key identifiers(KID) and media decryption keys, and delivers a pssh box received from the license server to the client device, with the pssh box being included in a DASH MPD or a media segment,
wherein the license server creates multiple Entitlement Control Licenses (ECLs) based on the key list and delivers an ECL list including the created ECLs to the CP manager, wherein each of the ECLs includes an encrypted media decryption key and an encrypted KID that correspond to each other, and wherein the CP manager receives the key list from the DASH encoder, delivers the key list to the license server, generates a pssh box in which the ECL list received from the license server is inserted, and delivers the generated pssh box to the DASH encoder, wherein KID/ECL pairs are included in a data field of the pssh box, where the client device decrypts the encrypted media decryption key and the encrypted KID, from the ECL list included in the pssh box.

* * * * *